United States Patent [19]
Du Bois et al.

[11] 3,821,902
[45] July 2, 1974

[54] ELECTRIC KITCHEN APPLIANCE
[75] Inventors: Jean P. Du Bois, Niles; Eugene S. Wassel, La Grange, both of Ill.
[73] Assignee: Sunbeam Corporation, Chicago, Ill.
[22] Filed: May 13, 1971
[21] Appl. No.: 142,895

Related U.S. Application Data
[60] Division of Ser. No. 761,780, Sept. 23, 1968, which is a continuation of Ser. No. 464,286, June 16, 1965, abandoned.

[52] U.S. Cl............................ 74/16, 74/22, 259/1, 310/50
[51] Int. Cl............................................ F16h 19/02
[58] Field of Search............ 74/16, 22, 425; 259/1, 259/DIG. 28

[56] References Cited
UNITED STATES PATENTS
| 2,616,732 | 11/1952 | Schwaneke | 259/1 X |
| 2,685,435 | 8/1954 | Moore | 259/1 |
| 2,737,371 | 3/1956 | Gerry | 259/1 |
| 3,152,398 | 10/1964 | Freeman | 74/50 X |
| 3,170,674 | 2/1965 | Gomersall et al. | 259/1 |

Primary Examiner—Leonard H. Gerin
Attorney, Agent, or Firm—George R. Clark; Neil M. Rose; John S. Pacocha

[57] ABSTRACT

A combination rotary heater and reciprocating knife appliance.

4 Claims, 6 Drawing Figures

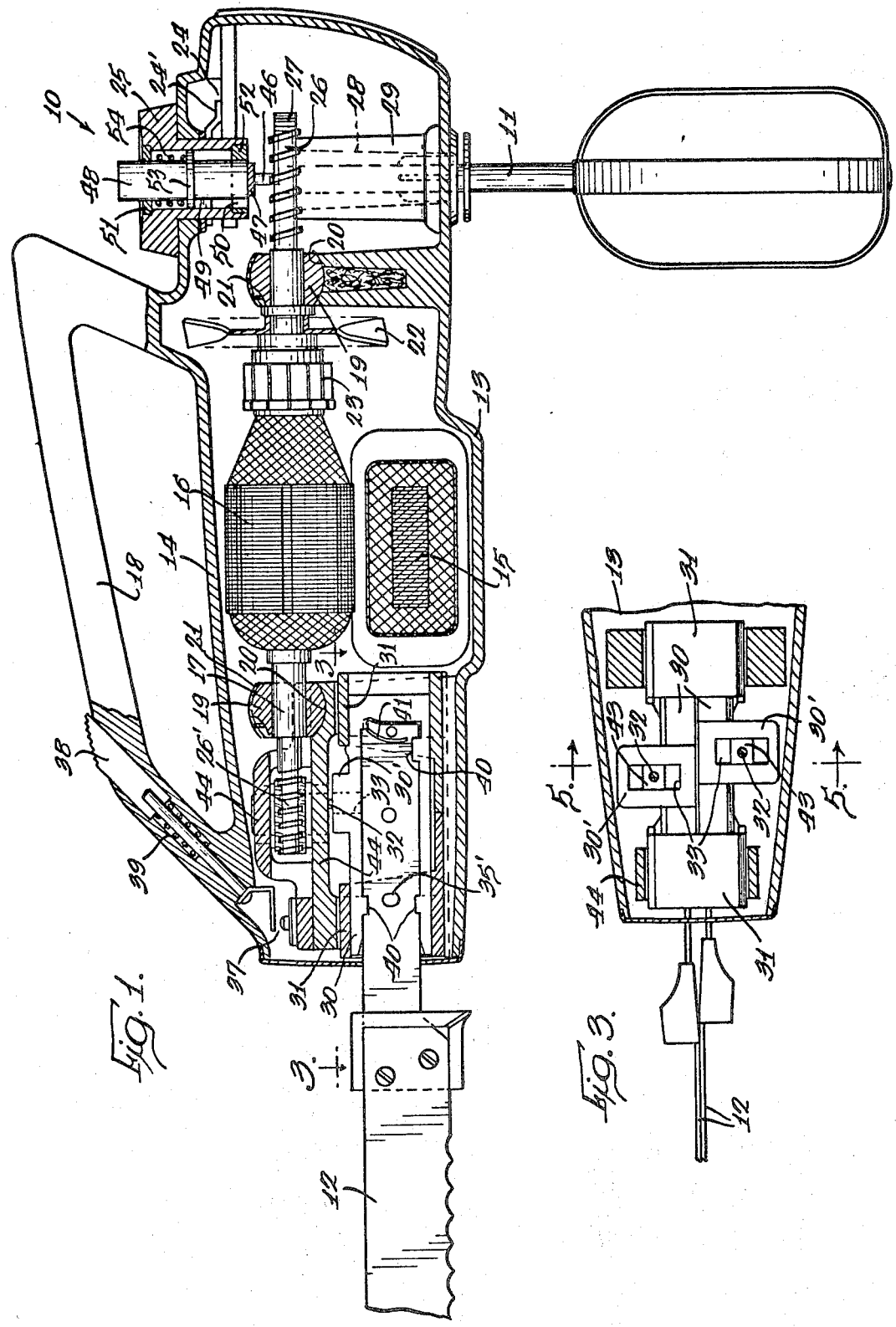

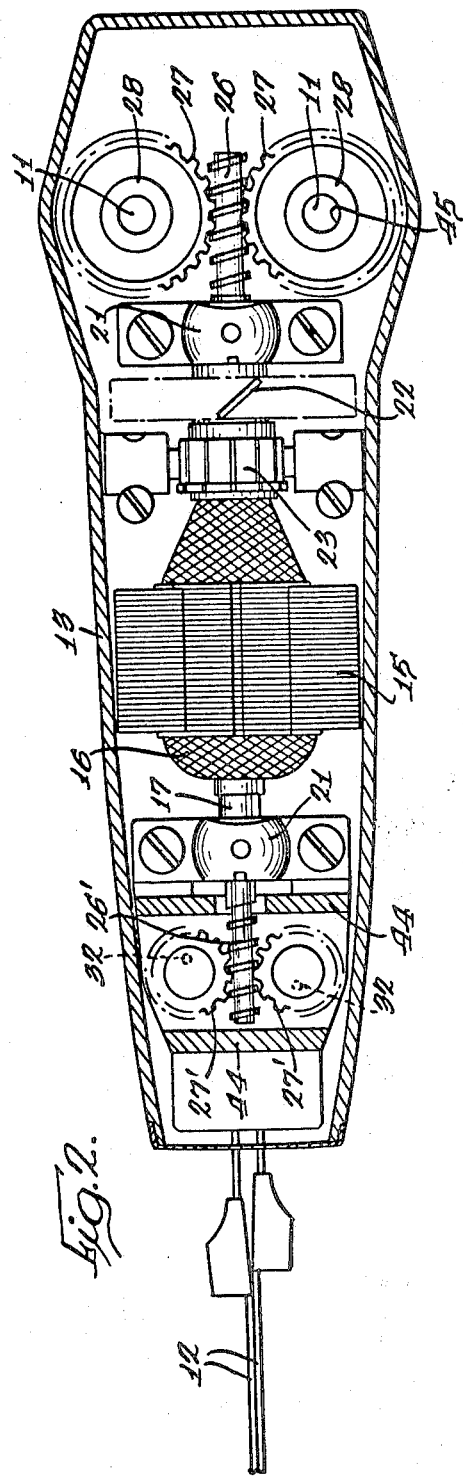
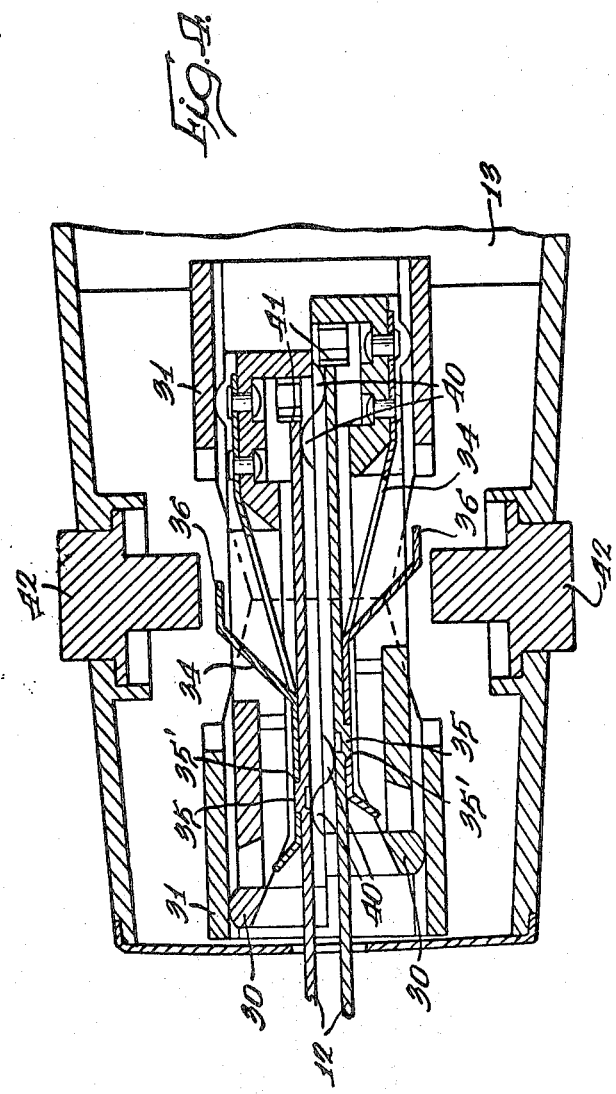

ELECTRIC KITCHEN APPLIANCE

This application is a division of United States application Ser. No. 761,780, filed Sept. 23, 1968, now patent No. 3,595,093 which is a continuation of United States application Ser. No. 464,286, filed June 16, 1965, now abandoned, by the inventors of the present application.

This invention relates to an electric kitchen appliance, and more particularly, to a combination electric hand mixer and knife.

The electric hand mixer is an appliance that over the years has become very well known and popular. It is an appliance that today can be found in the kitchen of most homes. Over the years, its development has reached such a high state that it is now very low cost and within the financial means of most shoppers.

More recently, the electric knife has been introduced on the market. It too has achieved a very high degree of popularity. However, generally speaking it is not as low cost as hand mixers. Also, because of its relative newness a shopper may be more apt to view it as being reserved for special gift purchasing. Of course, in fact an electric knife is as useful as a hand mixer in terms of frequency of use.

It is an object of this invention to make the electric knife and hand mixer available at not much more than the price of either one of these appliances alone.

In the invention, this is accomplished by providing a combination electric hand mixer and knife. The electric knife is built into the electric hand mixer which is so low cost and commonplace. More particularly, in the invention the conventional hand mixer is modified to receive a knife blade at its end opposite to the end which receives the mixer beater shaft. Thus in large measure it is possible to use standard mixer parts. Typically, in a hand mixer the beaters are driven off the front end of the mixer motor. In the invention, since the rear end of the mixer motor isn't being utilized, the knife blade is driven off the rear end of the motor. This solution makes it possible to provide a dual purpose appliance without an appreciable increase in cost over either one of them alone. In addition, by having dual purposes built into the single unit there is a conservation of kitchen storage space over that required by two separate electric hand mixer and electric knife appliances.

The invention will be better understood by considering the following description taken in connection with the accompanying drawings, and its scope will be pointed out in the appended claims.

In the drawings, FIG. 1 is a broken away side elevation view of one form of the invention;

FIG. 2 is a broken away top view of the device;

FIG. 3 is a sectional view taken along the section line 3—3 of FIG. 1;

FIG. 4 is an enlarged broken away view similar to that of FIG. 3;

Figure 5:
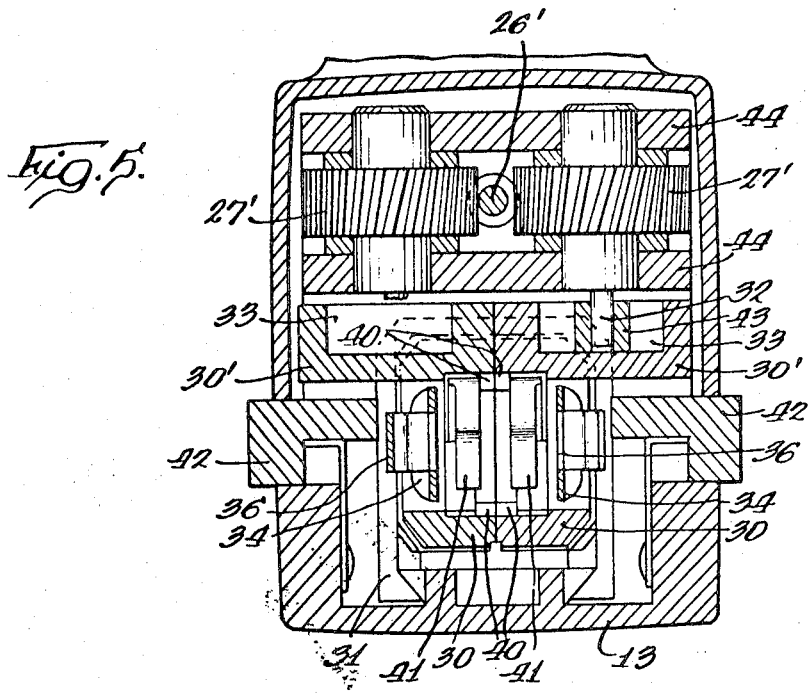
FIG. 5 is an enlarged sectional view taken along the section line 5—5 of FIG. 3.
Figure 6:
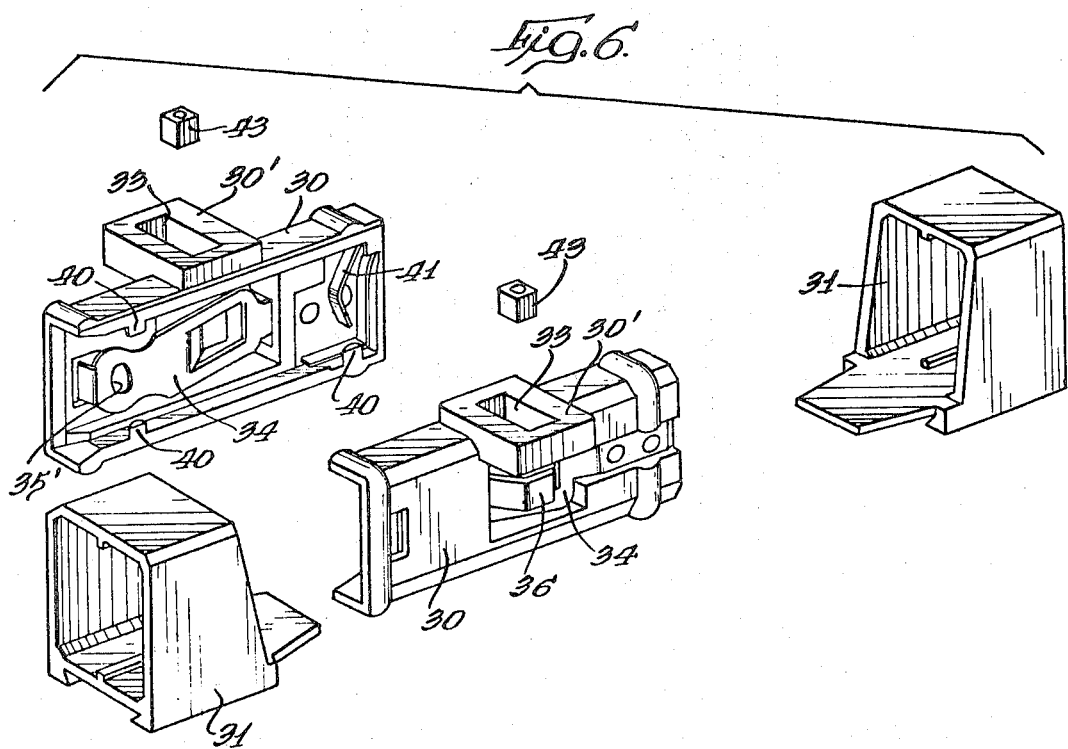
FIG. 6 is an exploded perspective view of the knife blade drive mechanism.

The drawings show a hand held type mixer 10 which is adapted to drive mixer beater shafts 11 off its front end and knife blades 12 off its rear end. Mixer 10 has a casing comprising a base part 13 and a cover part 14. Inside the casing there is a motor comprising a stationary field 15 and a rotary armature 16 mounted on an armature shaft 17.

The shaft 17 extends lengthwise of the casing which is elongated. The beater shafts 11 are located at the front end of the mixer and depend from the bottom thereof in perpendicular relationship with respect to the length of the mixer. The knife blades 12 extend out from the rear end of the mixer lengthwise thereof.

As is conventional in the mixer art, the upper casing part 14 is provided with a handle 18 which extends lengthwise of the combination appliance. The motor is located midway of the mixer and knife part thereof for proper balance and for use of either end thereof for its intended function. It is not intended that the beaters 11 and blades 12 be used simultaneously.

The shaft 17 is supported at its opposite ends in a pair of bearings 19 seated in bearing seats 20 formed on the abase 13. Bearings 19 are held in place by retainers 21. The motor is provided with a cooling fan 22 and a brush and commutator structure designated generally by reference numeral 23.

At its front end, a multiple speed and off switch 24 is provided. This switch can have a high, low, medium and off position and a control knob 25. At its front end, the shaft 17 is provided with a worm 26. This worm 26 is in drive engagement with a pair of worm gears 27. Gears 27 are connected to rotary beater shaft drive members 28. Drive members 28 are rotary spindles mounted in bearings 29, and they are adapted to releasably receive the inner ends of the beaters 11 in a manner well known to those skilled in the art. In fact, all the mixer parts so far described are well known in the prior art.

At the rear or left hand end of the appliance (when viewing FIG. 1) the motor shaft 17 is provided with another worm 26' and worm gears 27' similar to the right hand end. In addition, beneath the gears 27' are a pair of blade receiving reciprocatory blade carrier drive members 30. Members 30 are opposed to each other and are guided in their back and forth movement in a pair of spaced and annular shaped guide members 31. The gears 27' are mounted for rotation about vertical axes and reciprocate the drive members 30 through a scotch yoke arrangement comprising depending eccentric pins 32 on the gears 27' operating in slots 33 formed in integral portions 30' of members 30. The inner ends of blades 12 are inserted between the members 30 between a pair of springs 34 carried by members 30. The blades 12 have lugs 35 which snap into apertures 35' formed in the springs 34. In order to release the blades 12, the portions 36 of springs 34 are depressed towards each other to move their apertures 35' away from around the blade lugs 35.

A switch 37 is provided at the left hand end of the casing for controlling the on and off position of the knife part of the combination appliance. Switch 37 is provided with a thumb actuator 38. The two switches 24 and 37 are connected in parallel with each other so that either one will control the motor. In other words, when either one is off the other can turn the motor on.

When the device is being used as a mixer, the right hand end of the device is held away from the user and the mixer is controlled by switch 24. When the device is being used as a knife, the left hand end of the device is held away from the user and the knife is controlled by the switch 37. When the knife end is being used, of course, the switch 24 is moved to off position. When the mixer end is being used, the switch 37 is moved to off position automatically by a spring 39. It could happen that after using the mixer end, a housewife would turn the device off by merely pulling out the not shown electrical cord instead of turning the switch 24 to off position. Thereafter, if she inserted the blades to use the knife end, upon plugging in the cord the blades would suddenly be driven because the switch 24 was not previously moved to off position. Therefore, when changing over from mixer to knife use, the switch 24 should always first be moved to off position before inserting blades 12. However, to overcome the likelihood of a user accidentally inserting the blades when the switch 24 is still closed, it is possible to employ an interlock between the switch 24 and the blade receiving carriers 30 so that no blades can be inserted in the carriers 30 whenever the switch 24 is in closed position.

The knife drive mechanism such as parts 30, 31 and 34 is not part of the instant invention but comprises part of the invention described and claimed in patent application Ser. No. 532,261, filed Mar. 7, 1966, now U.S. Pat. No. 3,417,469, by Cousins et al for ELECTRIC KNIFE, and assigned to the same assignee as the instant application. Therefore, only so much thereof will be described herein as is necessary for a clear understanding of the instant invention.

The blade carriers 30 face each other and are nested within the annular guides 31. Carriers 30 slide along each other and the guides 31. The inner ends of blades 12 are inserted into the carriers 30 between their springs 34 and three integral lugs 40 formed on carriers 30. An end spring 41 in the carriers 30 pushes outwardly on the inner end of the blades 12 to take up any looseness between the blade lugs 35 and their apertures 35'. In order to release the blades, a pair of buttons 42 on opposite sides of the housing are depressed to in turn depress the portions 36 of springs 34. When portions 36 are squeezed towards each other, the outer ends of the springs 34 are pivoted away from the blades at their central portions directly on the blades to move the apertures 35' away from the blade lugs 35. The instant the apertures 35' clear the lugs 35, the end springs 41 urge the blades outwardly slightly to move the lugs 35 aaway from alignment with the apertures 35' so that the blades are released upon release of the buttons 42.

In the mentioned patent application, the carriers are reciprocated by connecting rods. If connecting rods were used herein to drive carriers 30, this would require an increase in length over the drive connection employed in the instant invention. By using worm gears 27' which have axes perpendicular to the worm 26' and the eccentric 32 and slot 33 drive connection, a considerable reduction in length is achieved. The eccentrics 32 depend from the worm gears 27' and are disposed over the central portions of the carriers 30 above their integral portions 30'. The lower ends of the eccentrics 32, which are actually pins, have drive blocks 43 mounted thereon which move back and forth across the slots 33 as the worm gears 27' rotate to reciprocate the carriers 30.

The subassembly of guides 31 and their internal carriers 30 are supported within a support frame 44 which is fixed in the knife end of the appliance housing. Frame 44 also provides the bearing seat 20 for the bearing 19 at that end of the appliance. One of the contacts for switch 37 is also supported in the frame 44. In addition, frame 44 also provides a bearing support for the worm gears 27' along opposite sides of the worm 26'.

At the mixer end of the appliance, the control knob 25 operates a switch contact arm 24' to provide off and multiple speed positions for the motor. It is within the scope of the invention to provide switch 37 with multiple speed positions or to omit knife control 37 and employ just a single control such as 24 for both ends of the device, that is to say, to provide multiple speeds for the beaters 11 and also the knife blades 12. A range of speeds is desired for the beaters 11 so that they will be able to handle different food stuffs. A range of speeds may be desired for the blades 12 to provide for speed selectivity depending upon the food being cut and the cutting operation being conducted.

The spindles 28 are hollow or open at their upper ends and the worm gears 27 have aligned central openings 45 to make the beater shafts 11 accessible to a pair of downwardly projecting beater ejecting fingers 46. Fingers 46 depend from a cross piece 47 connected to a depressible ejector button 48 located within knob 25. The fingers project into openings 45 and when button 48 is depressed, the fingers 46 push down on the beater shafts 11 to eject the beaters from their releasable drive connection with the rotary spindles 28. This type of beater ejector is well known in the art.

Heretofore, it was stated that after a mixing operation, the user instead of turning the switch 24 to off position might merely turn the appliance off by pulling out the not shown extension cord connecting the appliance to an electric wall socket. The beaters would be ejected by operating the button 48. Thereafter, the user might insert the blades 12 and then replug the appliance cord in the wall socket. However, since the switch 24 had not previously been turned to off position, the motor would suddenly start up and drive the blades. The hazard posed by the user forgetting to first turn the switch 24 to off position before inserting the blades and cord can be very simply overcome by so arranging the ejector button 48 and switch 24 so that the beaters 11 cannot be ejected unless switch 24 is first moved to off position. Such a combination is old in the art and can be provided in the instant invention by having a lug 49 formed on ejector 48 which is operative to enter a slot 50 only when knob 25 is rotated to move the switch 24 to off position. The ejector 48 is guided in its up and down movement within the knob 25 by an upper and lower bearing or collar 51 and 52, respectively, and a central bearing flange 53. Flange 53 is fixed to ejector 48 and the collars 51 and 52 are fixed to knob 25. Collar 52 has the slot 50 formed therein and is nonrotatable with respect to knob 25. The ejector 48 doesn't rotate since its fingers 46 always at least partially project into the worm gear openings 45. Only when the knob 25 is rotated to off position is the slot 50 positioned directly beneath the lug 49. Therefore, only in this position of the switch 24 can the ejector 48 be moved down sufficiently to eject the beaters. In all other positions of the switch 24, the lug 49 will bottom against the collar 52 before the ejector 48 can eject the beaters 11. However, in the invention a coil spring 54 about ejector 48 above flange 53 biases the ejector 48 down to bottom the flange 53 against collar 52 after lug 49 enters slot 50. Therefore, the switch 24 cannot be moved to the on position after beaters 11 have been ejected to accidentally start up the blades 12. Knob 25 can be moved to turn the appliance to on position only by inserting the beaters 11 in the spindles 28. This causes the upper ends of beaters 11 to strike the fingers 46 to move the ejector 48 up to compress spring 54 and withdraw the lug from within the slot 50. The compressed spring 54 by itself isn't forceful enough to eject the beaters 11 after they are inserted into the spindles 28 in their drive connected position with the spindles. In order to eject beaters 11 positive finger pressure must be applied to ejector 48. In the raised position of ejector 48 since the lug 49 clears the slot 50, the knob 25 is no longer immovably trapped against rotation. Therefore, it is then free to be rotated to on position. In other words, in the invention there are separate controls 24 and 37 for the beaters and blades respectively, and the mixer control cannot accidentally drive the blades since the beaters can be ejected only when the mixer control is off and the motor can be energized by the mixer control only when the beaters are inserted in the device to use it as a mixer.

While there have been shown and described particular embodiments of the invention, it will be obvious to those skilled in the art that changes and modifications may be made without departing from the invention.

What is claimed as new and desired to be secured by Letters Patent of the United States is:

1. In a combination rotary beater and reciprocating knife appliance having a housing; a motor mounted therein having an output shaft; cutting blade actuating means slidably carried by said housing for engaging the tangs of a pair of cutting blades; mixer element actuating means rotatably carried by said housing for engaging the shaft of a pair of mixer elements; transmission means for reciprocating said cutting blade actuating means and rotating said mixer element actuating means; and means for enabling energization of said motor; parallel connected maintained contact switch means for energizing said motor during use of said appliance as a rotary beater, momentary contact switch means for energizing said motor during use of said appliance as a reciprocating knife and disabling means connected with said maintained contact switch means for enabling energization of said motor by said maintained contact switch means only when said appliance is used as a mixer apparatus.

2. In a combination rotary beater and reciprocating knife appliance having a housing; a motor mounted therein having an outpt shaft; cutting blade actuating means slidably carried by said housing for engaging the tangs of a pair of cutting blades; mixer element actuating means rotatably carried by said housing for engaging the shaft of a pair of mixer elements; transmission means for reciprocating said cutting blade actuating means and rotating said mixer element actuating means; and means for enabling energization of said motor; parallel connected maintained contact switch means for energizing said motor during use of said appliance as a rotary beater, momentary contact switch means for energizing said motor during use of said appliance as a reciprocating knife and disabling switch means connected with said maintained contact switch means for enabling energization of said motor by said maintained contact switch means only when said appliance is used as a mixer apparatus.

3. In a combination rotary beater and reciprocating knife appliance having a housing; a motor mounted therein having an output shaft; cutting blade actuating means slidably carried by said housing for engaging the tangs of a pair of cutting blades; mixer element actuating means rotatably carried by said housing for engaging the shaft of a pair of mixer elements; transmission means for reciprocating said cutting blade actuating means and rotating said mixer element actuating means; and means for enabling energization of said motor; parallel connected maintained contact switch means for energizing said motor during use of said appliance as a rotary beater, momentary contact switch means for energizing said motor during use of said appliance as a reciprocating knife and disabling switch means connected in series with said maintained contact switch means for enabling energization of said motor by said maintained contact switch means only when said appliance is used as a mixer apparatus.

4. In a combination rotary beater and reciprocating knife appliance having a housing; a motor mounted therein having an output shaft; cutting blade actuating means slidably carried by said housing for engaging the tangs of a pair of cutting blades; mixer element actuating means rotatably carried by said housing for engaging the shaft of a pair of mixer elements; transmission means for reciprocating said cutting blade actuating means and rotating said mixer element actuating means; and means for enabling energization of said motor; parallel connected maintained contact switch means for energizing said motor during use of said appliance as a rotary beater, momentary contact switch means for energizing said motor during use of said appliance as a reciprocating knife and means for selectively disabling said maintained contact switch means such that energization of said motor by said maintained contact switch means may occur only when said appliance is used as a mixer apparatus.

* * * * *